United States Patent [19]

Marko et al.

[11] Patent Number: 5,265,271
[45] Date of Patent: Nov. 23, 1993

[54] LOW BATTERY DETECTOR

[75] Inventors: Paul D. Marko, Ft. Lauderdale; Mark S. Stuglik, Margate; Michael B. Spring, N. Miami Beach, all of Fla.

[73] Assignee: Motorola, Inc., Schaumburg, Ill.

[21] Appl. No.: 763,738

[22] Filed: Sep. 23, 1991

[51] Int. Cl.⁵ .................................. H04B 1/16
[52] U.S. Cl. ........................... 455/343; 455/38.3; 455/127; 342/433
[58] Field of Search ............. 455/343, 38.3, 127, 455/38.2, 226.4; 342/433; 323/303; 320/13, 39

[56] References Cited

U.S. PATENT DOCUMENTS 4,636,741  1/1987  Mitzlaff .......................... 455/127

FOREIGN PATENT DOCUMENTS 0154539  6/1990  Japan ............................ 455/38.3

*Primary Examiner*—Reinhard J. Eisenzopf
*Assistant Examiner*—Philip J. Sobutka
*Attorney, Agent, or Firm*—Thomas G. Berry; Michael J. Buchenhorner

[57] ABSTRACT

An electronic device (100) operating on a battery voltage (126) is disclosed having a regulator (108) for producing a first reference voltage (106) and a second reference voltage (110). The electronic device (100) includes an A/D converter (114) for comparing the battery voltage (126) to the first reference voltage (106) to produce a first sample. The A/D converter (114) also compares the second reference voltage (110) to the first reference voltage (106) to produce a second sample. The two samples are then subtracted at a micro-computer (112) to produce a difference sample. The microcomputer (112) compares the difference sample to a first value and detects low battery conditions when the difference sample is below the first value.

15 Claims, 2 Drawing Sheets

LOW BATTERY DETECTOR

TECHNICAL FIELD

This invention relates generally to electronic devices and more specifically relates to a device having a low battery detector.

BACKGROUND

Low battery detectors are well known in the art. A device operating on battery may include a low battery detector to evaluate the voltage level of the battery as applied to the device. These detectors generally monitor battery voltage and compare that to a set level. Once the battery voltage falls below that set level, the detector proceeds to alert the user of the battery condition or simply shuts the device down. The operation of these low battery detectors generally depends on the operating voltage of the device. This operating voltage is a regulated voltage generated in the device. A problem with these battery detectors is that they must identify low battery conditions while the regulated operating voltage is still regulated. Low battery conditions detected in such manner are detected generally sooner than the battery voltage is such that to justify shut down. This is because many of the elements of electronic devices can operate below the regulated voltage designed into the device. However, no alternatives are available to check for low battery conditions when regulation is lost. It is obvious that such early indication of low battery results in the waste of the battery capacity because the shut-down or low battery alarm is reported sooner than necessary, resulting in premature alarm or shut down. A need is therefore clear for a low battery detector that can operate even when the device's regulated voltage is no longer in regulation.

SUMMARY OF THE INVENTION

An electronic device operating on a battery voltage is disclosed having means for producing first and second reference voltages. The electronic device includes a first means for comparing the battery voltage to the first reference voltage to produce a first sample. The electronic device also includes a second means for comparing the second reference voltage to the first reference voltage to produce a second sample. The two samples are subtracted using a means for subtracting to produce a difference sample. This difference sample is compared to a first value using a third means for comparing. A detector detects low battery conditions when the difference sample is below the first value.

DETAILED DESCRIPTION OF THE PREFERRED EMBODIMENT

Figure 1:
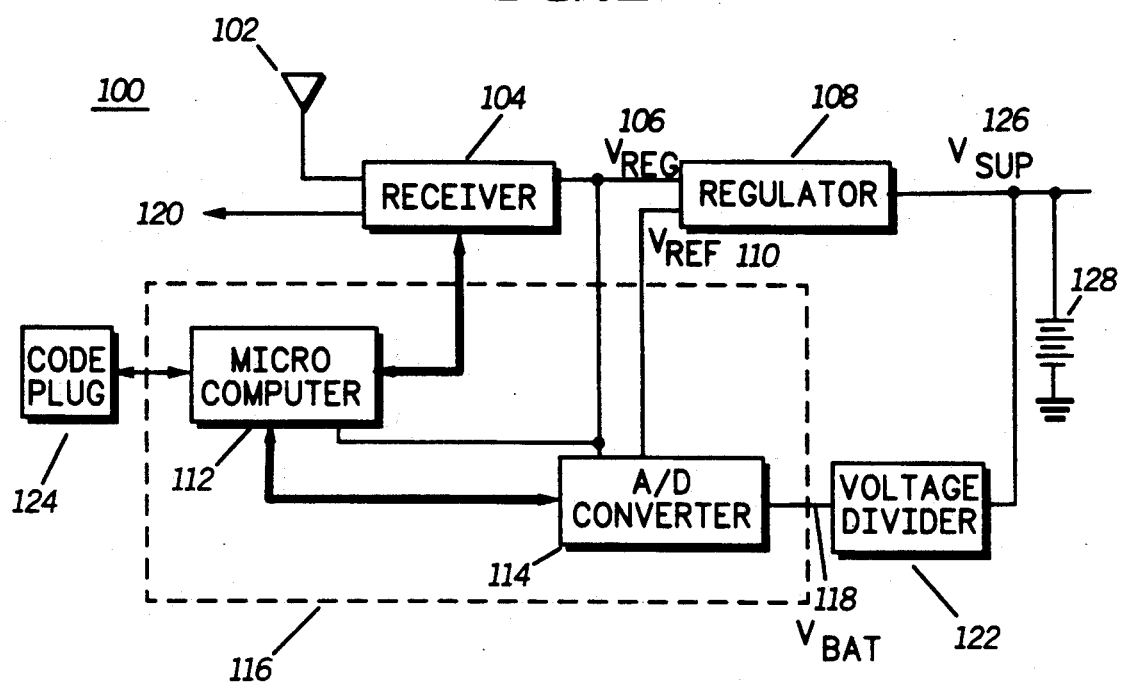
FIG. 1 shows a block diagram of a receiver in accordance with the present invention.

Referring to FIG. 1, a block diagram of a radio communication device 100 is shown in accordance with the principles of the present invention. An antenna 102 is used to couple radio frequency signals to a receiver 104. The receiver 104 includes circuitry to demodulate the received signals. The demodulated signals are coupled to other elements of the communication device 100 via line 120. A regulator 108 is used to provide the device 100 with a first and a second reference voltage, $V_{reg}$ 106 and $V_{ref}$ 110, respectively. The earlier is the operating voltage for the elements of the device 100. The input power to the regulator 108 is provided by a battery 128 having a $V_{sup}$ 126. The nominal operating voltage of the battery 128 is preferably 3.6 volts. The battery voltage $V_{sup}$ 126 is coupled to an analog to digital (A/D) converter 114 via a voltage divider 122. The voltage divider 122 reduces the $V_{sup}$ 126 to a level $V_{bat}$ 118 appropriate for couple to the A/D converter 114. The second reference voltage, $V_{ref}$ 110 is coupled to the A/D converter 114 as a reference voltage. This reference voltage is maintained in regulation with the battery voltage $V_{sup}$ 126 well below $V_{reg}$ 106, hence it will be in regulation well after the regulation of $V_{reg}$ 106 is lost. The A/D converter 114 is coupled to a micro-computer 112 which controls the operation of the device 100 including the receiver 104. The A/D converter 114 and the micro-computer 112 are combined in the preferred embodiment to produce a controller 116. The controller 116 is which includes comparators to provide the first, second, and third means for comparing of the present invention. The controller 116 also includes detectors and the means for subtracting of the device 100. To better understand the operation the device 100 the aforementioned elements will be discussed separately.

Figure 3:
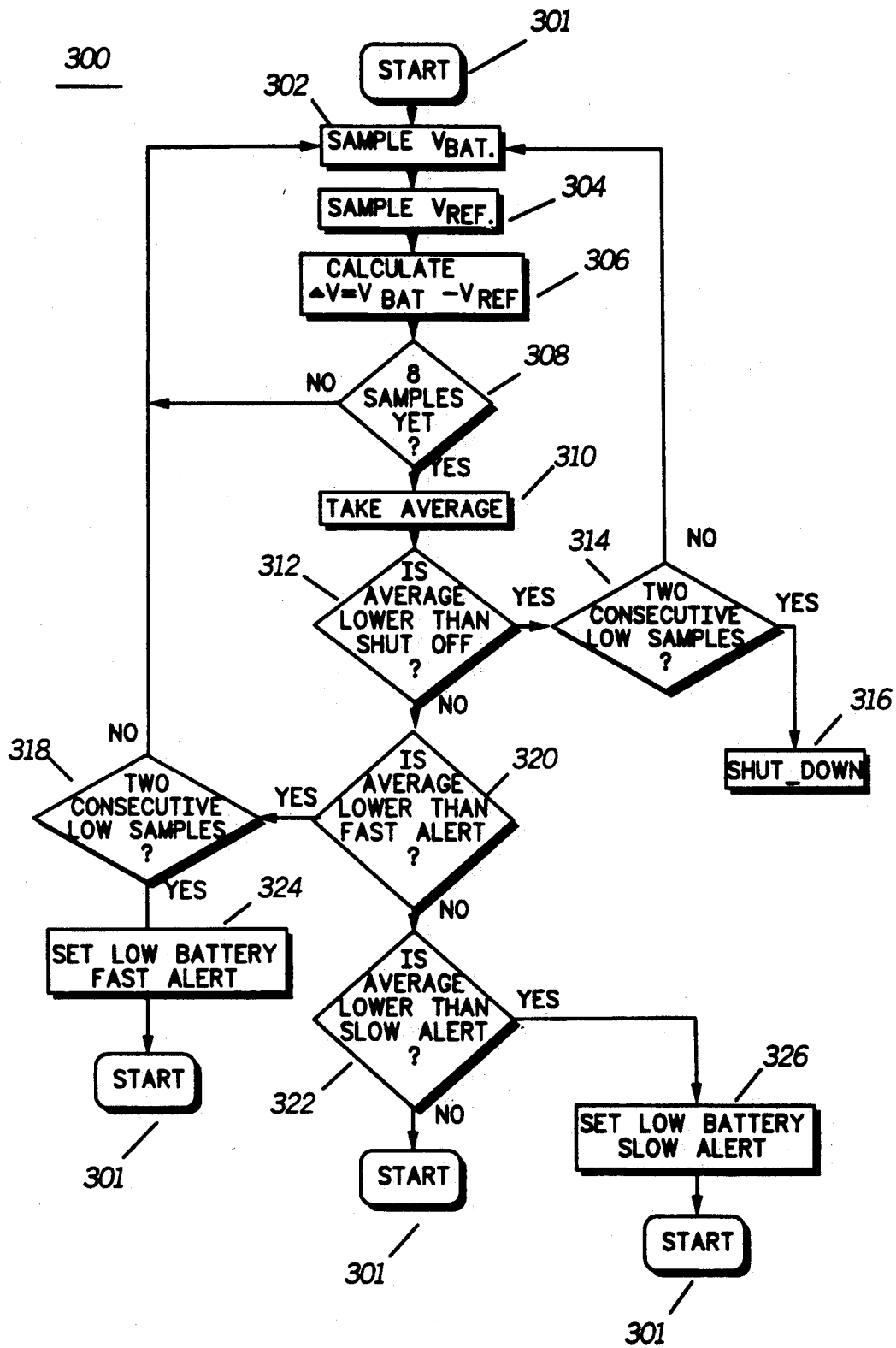
FIG. 3 is a flow chart of the operation of a battery saver in accordance with the present invention.

The A/D converter 114 periodically samples the $V_{bat}$ 118 and the $V_{ref}$ 110 to determine their instantaneous value. Since the converter 114 operates on $V_{reg}$ 106, the collected samples will depend on $V_{reg}$ 106 as well. This means that as the level of the $V_{reg}$ 106 changes so do the sample values collected by the A/D converter 114. The sample values are communicated from the A/D converter 114 to the micro-computer 112 where they are subtracted from each other and a difference sample of the two voltages $V_{bat}$ 118 and $V_{ref}$ 106 is calculated. The micro-computer 112 compares this difference sample to values stored in a code plug 124 to determine whether the battery is in a shut-off condition or in a warning or alert condition. Once such determination has been made, the device 100 will be shut-off or an alarm is sent to the user to indicate low battery conditions. The flow chart 300 of FIG. 3 provides more details of the operation of the device 100.

Figure 2:
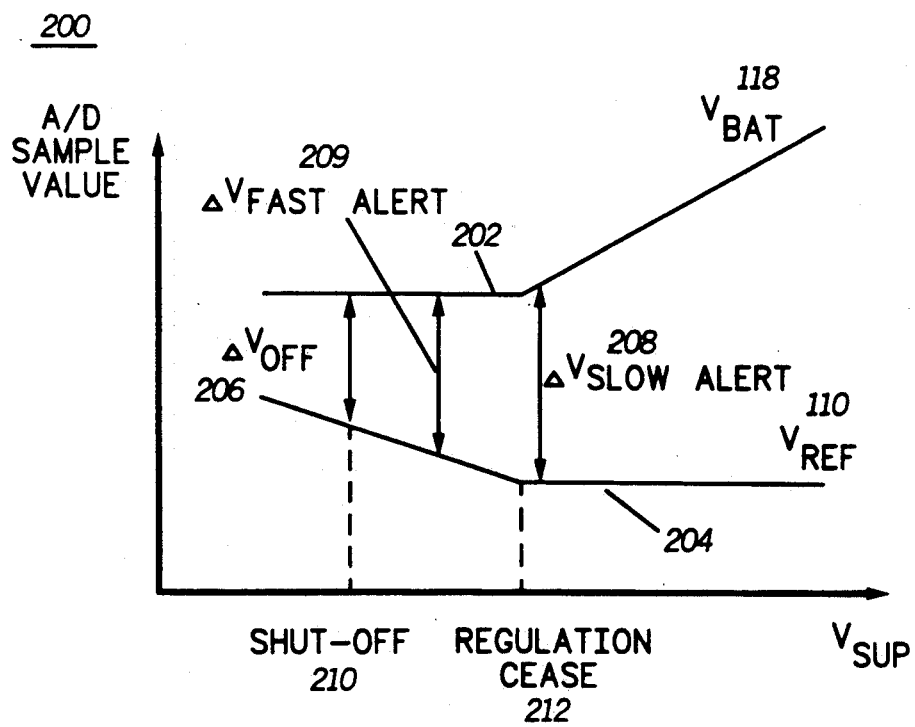
FIG. 2 is a plot of voltage samples taken as supply voltage is varied.

Referring now to FIG. 2, plots of the samples of $V_{bat}$ 118 and $V_{ref}$ 110 taken by the A/D converter 114 are shown as the battery voltage $V_{sup}$ 126 varies. The horizontal axis shows the battery voltage $V_{sup}$ 126 while the vertical axis shows the sample values taken by the A/D converter 114. Plot 202 shows the variations of sampled $V_{bat}$ 118 as the battery voltage $V_{sup}$ 126 is varied. Following plot 202 from right to left, as the level of the battery voltage $V_{sup}$ 126 diminishes, it can be seen that the samples of $V_{bat}$ 118 taken by the A/D converter 114 follow the decrease until a regulation cease point 212 is reached. This regulation cease point 212 occurs when the battery voltage $V_{sup}$ 126 is equal to the regulator voltage $V_{reg}$ 106 plus an overhead voltage. This overhead voltage is the differential voltage that is required between the input and output of the regulator 108 for proper regulation. Although not necessary, this regulation cease point 212 may be used as the trigger point to issue a first alert, or slow alert, to the user.

It is known in the art that regulators such as regulator 108 operate with a voltage differential. This voltage differential must be present between the input and the output of the regulator 108 in order to result in regulation. When $V_{sup}$ 126 drops below this minimum differential requirement, $V_{reg}$ 106 is no longer regulated at a fixed level and rather follows the battery voltage $V_{sup}$ 126 linearly. With the reduction in the $V_{reg}$ 106, the entire range of analog to digital conversion of the A/D converter 114 is reduced resulting in lower digitization step size. The net effect is that the samples taken from $V_{bat}$ 118 will assume a flat value as the battery voltage $V_{sup}$ 126 further decreases beyond the regulation cease point 212. In other words, the samples taken by the A/D converter 114 are offset by the same amount as the $V_{reg}$ 106 has decreased. Consequently, as the battery voltage $V_{sup}$ 126 reaches the regulation cease point 212, the samples taken on $V_{bat}$ 118 stop decreasing in value and rather a flat response is noticed.

The second plot 204 shows a plot of the samples taken on $V_{ref}$ 110 as the battery voltage $V_{sup}$ 126 is reduced. As long as the battery voltage $V_{sup}$ 126 is above the regulation cease point 212, the samples of $V_{ref}$ 110 will not increase in value because $V_{ref}$ 110 and $V_{reg}$ 106 remain constant. As soon as the regulation cease point 212 is reached by the battery voltage $V_{sup}$ 126, the samples will start increasing in value. This is due to the $V_{reg}$ 106 now decreasing in value thereby making the $V_{ref}$ 110 appear as if it is increasing in value. In other words, as the input voltage to the A/D converter 114 decreases, the collected samples of the reference voltage $V_{ref}$ 110, which is constant, appear to be increasing. The increase in the sample values of $V_{ref}$ 110 continues until a shut-off voltage 210 is encountered. This shut-off voltage 210 is set at a point where the operation of the device 100 can no longer continue without errors and malfunction. The code plug 124 contains this shut off level.

The sample values collected by the A/D converter 114 are continuously communicated to the micro-computer 112 where a difference sample is produced. This difference sample is continuously generated on the difference between instantaneous points of plots 202 and 204. As the difference between the two plots 202 and 204 reaches $\Delta V$ slow alert 208, the micro-computer 112 sends a slow alert to the user, however, the system continuous to operate. The code plug 124 contains the value of the $\Delta V$ slow alert 208 which is retrieved by the micro-computer 112 normally at system start up. The value stored in the code plug 124 may be changed for different applications. Indeed access to the contents of the code plug 124 may be provided so that the user may select when a low battery alert may be generated. Beyond the slow alert and as the battery voltage $V_{sup}$ 126 diminishes further, an optional fast alert point 209 may be reached. The fast alert indicates that shut-off is imminent. Note that the occurrence of slow or fast alert is independent of the regulation cease point 212. This is very significant as it allows operation of the low battery detection independent of the variation in the $V_{reg}$ 106 due to component tolerances or performance tolerance.

In the preferred embodiment $V_{reg}$ 106 is set to 3.2 +/− 0.1 volts and $V_{ref}$ 110 is set to 2.1 volts. However, the device 100 can operate at regulated voltages ($V_{reg}$ 106) as low as 3.0 making it possible to continue operation even when the battery voltage $V_{sup}$ 126 is below the regulated voltage $V_{reg}$ 106. Consequently, the $\Delta V$ slow alert 208 is set at 3.25 volts while shut-off point 210 is set to 3.1 volts. The regulation cease point 212 takes place when the battery voltage $V_{sup}$ 126 is at the regulated voltage ($V_{reg}$ 106) plus the regulator overhead. Furthermore, in the preferred embodiment the low battery slow alert is made via beeps that occur at 60 second intervals. Fast alert is via beeps that occur at 15 second intervals. These warning conditions may continue until the difference in the sample values reaches $\Delta V_{off}$ 206 which occurs at voltages below shut-off voltage 210. Naturally, the micro-computer 112 proceeds to shut the device 100 off as such a condition prevails.

As an alternative approach to the description of the present invention, the plots of FIG. 2 may be described in association with rates of change rather than trend of change. Therefore, referring once again to FIG. 2, it can be seen that the rate of change of $V_{bat}$ 118 as plotted by 202 is closely followed by the A/D converter 114. This rate of change will assume a negative value as the battery voltage $V_{sup}$ 126 continues to decrease. The point that the rate of change of $V_{bat}$ 118 changes to zero from a negative trend is the point that the supply voltage has reached the regulation cease 212. Simultaneously, the rate of change of $V_{ref}$ 110 is observed as the battery voltage Vsup 126 is decreased. It is observed that when regulation cease point 212 is reached, the rate of change of $V_{ref}$ 110 assumes a positive number from zero. At this point, a warning signal is provided to the user. However, the unit can still operate because the elements of the device 100 can operate at voltages below that indicated by the regulation cease point 212. As the sample values of $V_{ref}$ 110 increase in value, the difference between $V_{bat}$ 118 and $V_{ref}$ 110 becomes smaller and until a shut-off level of $\Delta V_{off}$ 206 is reached. This is a point that the device 100 can no longer operate and shut-off is enforced.

Referring now to FIG. 3, a flow chart of the operation of the controller 116 is shown in accordance with the principles of the present invention. From the Start block 301, the operation samples $V_{bat}$ 118, block 302. The reference voltage $V_{ref}$ 110 is then sampled, block 304. Following the sampling of the two voltages, a calculation determining the difference between the two sampled voltages is conducted to produce $$\Delta V = V_{bat} - V_{ref}$$

This operation is shown in block 306. An offset voltage may be used in the above calculation to avoid negative results. Note that the sampled voltage, Vbat 118, may have a lower value than Vref 110 due to the step down of the battery voltage Vsup 126 via the divider 122. The output of block 306 is coupled to a condition block 308 where it is determined whether N samples, and preferably 8 samples, of $\Delta V$ have been collected. The NO output returns the operation to block 302 where another sample of $V_{bat}$ and $V_{ref}$ is collected. The YES output of block 308 indicating that 8 samples have been collected is coupled to block 310 where the average of the 8 samples is generated. The generation of this average provides a buffer for errors that may have occurred in the sampling or even a glitch that may have been present on the sampled voltage lines. The average is then compared to a first value, preferably the shut-off value, block 312. Note that the value to which the average is compared is stored in the code plug 124. The YES output of the condition block 312 is coupled to another condition block 314 where it is determined whether two consecutive low samples have been detected. The NO output of the condition block 314 is coupled back to the sample $V_{bat}$ block 302. The YES output of the condition block 314, indicating that two consecutive low samples have been collected, is coupled to block 316 where the device is shut down. The NO output of the condition block 312 is coupled to yet another condition block 320 where it is determined whether the average is lower than a second value, preferably fast alert, block 320. The fast alert value is a first warning value which indicates to the user that low battery conditions are about to happen but some time is left before such conditions will prevail. This fast alert condition corresponds to the warning point 21 of FIG. 2. When the average is lower than fast alert value, the YES output, a determination is made whether two consecutive low samples have been detected, block 318. The NO output is once again routed back to block 302 where samples are regenerated. The YES output of block 318, however, results in setting the low battery fast alert, block 324. Once the low battery fast alert has been set, the operation returns to the start block 301 repeating the entire flow chart 300. The fast alert notice occurs when the condition of the battery is such that shut-off condition may occur at any time. This notice may be in the form of beeps 15 seconds apart.

The NO output of condition block 320 is coupled to a condition block 322 where it is determined whether the average value is lower than a slow alert value. The slow alert value used for the operation of block 322 is a value determined to be critical so far as the battery condition is concerned indicating that the low battery conditions are prevailing and shut down may occur but not imminently and not before fast alert notice has been generated. The YES output of the condition block 322 results in setting the low battery slow alert indicator, block 326. The slow alert may be in the form of beeps 60 seconds apart. Obviously, the operator will have to take appropriate action at this point to replace battery and/or use the device 100 for emergency contacts only. The NO output of the condition block 322 and the output of the block 326 are both returned to the start block 301 where the operation is resumed.

To summarize, the device 100 includes the controller 116 comprising the micro-computer 112, and the A/D converter 114. The A/D converter, operating on the regulator voltage $V_{reg}$ 106, collects samples of the battery voltage $V_{bat}$ 118 and the reference voltage $V_{ref}$ 110. These samples may be collected with higher frequency as the supply voltage $V_{bat}$ 118 diminishes. The samples collected by the A/D converter 114 decrease in value as the battery voltage Vsup 126 decreases due to the fact that the regulator voltage $V_{reg}$ 106 remains constant. As soon as the battery voltage $V_{bat}$ 118 reaches the regulation cease point 212, the samples of $V_{bat}$ 118 flatten in value. This is due to the fact that $V_{reg}$ 106 is now decreasing at the same rate as the $V_{bat}$ 118 resulting in the samples collected by the A/D converter 114 to be flat. On the other hand, the samples of $V_{ref}$ 110, are flat until the regulation cease point 212 is encountered. At that time, the samples will start increasing in value. This increase occurs because the reference voltage for the A/D converter $V_{reg}$ 106 is now decreasing while $V_{ref}$ 110 remains the same resulting in samples having higher values at each instant of time. The determination that the regulation cease point 212 has been reached can be made either by subtracting the sample value of $V_{bat}$ 118 and $V_{ref}$ 110 or can be determined by monitoring the rate of change of the two sampled $V_{bat}$ 118 and $V_{ref}$ 106.

The ability to detect low battery condition even when the voltage regulation has ceased is significant because the maximum battery capacity can be achieved without jeopardizing sudden or no shut-off. By using a second reference voltage $V_{ref}$ 110, the A/D converter 114 can accurately track the battery voltage $V_{sup}$ 126 even when the regulator voltage $V_{reg}$ 106 is out of regulation. In devices where a single regulated output is all that is relied upon to detect and report battery condition, a significant waste of battery energy results as precautions must be taken to protect low battery alert while device is still operational.

A significant benefit of this invention is that it provides devices with the ability to change levels at which alerts of low battery conditions are produced or even when shut-down should occur, without having to change components. With the code plug 124 different values can be stored to force the device 100 to go into alert condition or shut-down condition at any point desired by the user. This is desirable in certain applications where the users would like the low battery conditions to occur perhaps sooner or even later than others.

Yet another benefit of the present invention is that low battery detection is performed independent of the tolerance of the regulator. In the prior art, a safety cushion is generally calculated in the design of the battery detection circuits to provide for the tolerance of the regulator. This safety cushion inevitably results in detection of low battery prematurely and when the battery has some remaining energy. With this invention the need for safety cushion is eliminated since the tolerance of the regulator no longer plays a role in the detection of the low battery. It is clear that a true low battery detection can now be expected using the principles of the disclosed invention.

What is claimed is:

1. In an electronic device operating on a battery voltage and having a regulator voltage and a reference voltage, a method for detecting low battery voltage conditions, comprising the steps of:
   comparing the battery voltage to the regulator voltage to produce a first sample;
   comparing the reference voltage to the regulator voltage to produce a second sample;
   generating the difference between the first and the second samples;
   comparing the difference to a value stored in a memory; and
   indicating low battery conditions when the difference is below the value.

2. The method of claim 1, further including the step of detecting when the difference is below a second stored value associated with a low battery warning point.

3. The method of claim 1, wherein the step of comparing the battery voltage includes digitizing the battery voltage relative to the regulator voltage.

4. The method of claim 1, wherein the step of comparing the reference voltage includes digitizing the reference voltage relative to the regulator voltage.

5. An electronic device operating on a battery voltage, comprising:
   means for producing a first and a second reference voltage;
   first means for comparing the battery voltage to the first reference voltage to produce a first sample;
   second means for comparing the second reference voltage to the first reference voltage to produce a second sample;
   means for subtracting the first and the second samples to produce a difference sample;

third means for comparing the difference sample to a first value; and means for detecting low battery conditions when the difference sample is below the first value.

6. The electronic device of claim 5, further comprising means for detecting low battery warning conditions when the difference sample is below a second value.

7. The electronic device of claim 5, wherein the means for producing comprises a voltage regulator.

8. The electronic device of claim 5, wherein the first, second, and third means for comparing comprise a controller.

9. The electronic device of claim 8, wherein the controller comprises a micro computer.

10. The electronic device of claim 5, wherein the first and second means for comparing comprise an analog to digital converter.

11. The electronic device of claim 9, wherein the computer includes means for generating the difference between the first and the second samples.

12. A battery powered radio communication device operating on a regulated voltage generated from a battery voltage, comprising:

a reference voltage;

a controller operating on the regulated voltage for:
comparing the battery voltage and the reference voltage to the regulated voltage to produce sampled voltages;
subtracting the sampled battery voltage and the sampled reference voltage to produce a difference voltage;
detecting or determining when the difference voltage is below a stored level associated with a low battery condition; and
detecting or determining when the difference voltage is at or below another stored level associated with a device shut off condition;

whereby, the battery powered radio communication device is capable of operating with a battery voltage below that required to maintain regulation of the regulated voltage.

13. The radio communication device of claim 12, wherein the controller includes an analog to digital converter.

14. A battery powered radio communication device operating on a regulated voltage generated from a battery voltage and comprising:

receiver means for receiving radio frequency signals;

a reference voltage;

circuitry for comparing the battery voltage and the reference voltage to the regulated voltage to produce a sampled battery voltage and sampled reference voltage and calculating the rate of change between the sampled battery voltage and the sampled reference voltage; and means for detecting or determining when the arithmetic sign or slope of the rate of change varies from a negative value to a positive value.

15. A method for operating a battery powered electronic communication device having electronic circuitry operating on a regulated voltage generated from a battery voltage, a method comprising the steps of:

operating, initially, the electronic circuitry from the regulated voltage;

detecting or determining via battery monitoring circuitry that compares the battery voltage and a reference voltage to the regulated voltage to produce respective first and second samples and compares the difference thereof to a stored threshold value representative of when the battery voltage is at or below a level where the regulated voltage becomes an unregulated voltage; and continuing to operate the electronic circuitry such that the battery powered radio communication device is capable of operating with a battery voltage below that required to maintain regulation of the regulated voltage.

* * * * *